(12) United States Patent
Bunyer et al.

(10) Patent No.: US 10,378,247 B2
(45) Date of Patent: Aug. 13, 2019

(54) DETACHABLE ACCESSORY AND LATCH FOR SAME

(71) Applicant: Harley-Davidson Motor Company Group, LLC, Milwaukee, WI (US)

(72) Inventors: Michael Bunyer, Menomonee Falls, WI (US); Jeffrary Ronald Sonnentag, Waukesha, WI (US); Scott Hein, Plymouth, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 324 days.

(21) Appl. No.: 15/458,392

(22) Filed: Mar. 14, 2017

(65) Prior Publication Data

US 2018/0266148 A1 Sep. 20, 2018

(51) Int. Cl.
*B62J 1/28* (2006.01)
*B62J 9/00* (2006.01)
*E05B 73/00* (2006.01)
*E05B 35/00* (2006.01)
*E05B 61/00* (2006.01)
*E05B 63/00* (2006.01)
*E05B 79/02* (2014.01)
(Continued)

(52) U.S. Cl.
CPC ............... *E05B 73/00* (2013.01); *B62J 1/28* (2013.01); *B62J 9/001* (2013.01); *E05B 35/00* (2013.01); *E05B 61/00* (2013.01); *E05B 63/00* (2013.01); *E05B 79/02* (2013.01); *E05B 83/00* (2013.01); *E05B 85/10* (2013.01); *F16B 2/12* (2013.01); *F16B 2/185* (2013.01); *E05B 2015/107* (2013.01); *F16B 39/24* (2013.01)

(58) Field of Classification Search
CPC ......... B62J 1/28; B62J 7/02; B62J 7/04; B62J 9/001; Y10T 403/59; Y10T 403/591; Y10T 403/599; Y10T 403/60; Y10T 403/602; Y10T 403/608; Y10T 403/32254; Y10T 403/32262
See application file for complete search history.

(56) References Cited

U.S. PATENT DOCUMENTS 5,667,232 A 9/1997 Gogan et al.
6,347,804 B1 2/2002 Seibel
(Continued)

FOREIGN PATENT DOCUMENTS

JP 5303691 B1 * 10/2013 ............... B62J 1/28

*Primary Examiner* — Jonathan P Masinick
(74) *Attorney, Agent, or Firm* — Michael Best & Friedrich LLP

(57) ABSTRACT

A detachable accessory for a saddle-ride vehicle includes a latching assembly supported on a side plate and having a latch member and handle. The latch member has a hooked latching portion and an elongated portion. The latch member is supported at a fixed pivot on the side plate for rotation between unlatched and latched positions. The handle is supported on the elongated portion and is biased in a first direction so that an end portion of the handle follows the rear edge of the side plate and forms a detent mechanism including a male detent member, a first receptacle to receive the male member to hold the latch member in the unlatched position and a second receptacle to receive the male member to hold the latch member in the latched position. The first receptacle is shallower than the second. A cam surface extends from the first receptacle to the second.

20 Claims, 12 Drawing Sheets

(51) Int. Cl.
*E05B 83/00* (2014.01)
*E05B 85/10* (2014.01)
*F16B 2/18* (2006.01)
*F16B 2/12* (2006.01)
*E05B 15/10* (2006.01)
*F16B 39/24* (2006.01)

(56) References Cited

U.S. PATENT DOCUMENTS

| | | | |
|---|---|---|---|
| 6,443,344 B1 | 9/2002 | Nicosia et al. | |
| 6,484,914 B1 * | 11/2002 | Willey | B62J 1/28 224/413 |
| 6,971,714 B1 * | 12/2005 | Hanagan | B62J 1/12 297/215.11 |
| 7,175,220 B2 * | 2/2007 | Kashiwagi | B62J 1/28 280/288.4 |
| 7,264,293 B2 * | 9/2007 | Fischer | B60N 2/01583 248/503.1 |
| 7,549,243 B1 * | 6/2009 | Gilles | A01D 34/64 37/468 |
| 7,654,496 B2 * | 2/2010 | Sharpe | B62J 1/28 180/219 |
| 7,946,632 B1 * | 5/2011 | Mueller | B62J 1/28 280/288.4 |
| 8,267,613 B2 * | 9/2012 | Lindloff | B62J 1/28 403/322.4 |
| 8,876,174 B2 * | 11/2014 | Motherwell | B62J 1/28 292/194 |
| 8,888,059 B2 * | 11/2014 | Kohberg | B60K 15/067 248/201 |
| 2015/0203165 A1 | 7/2015 | Bunyer et al. | |

* cited by examiner

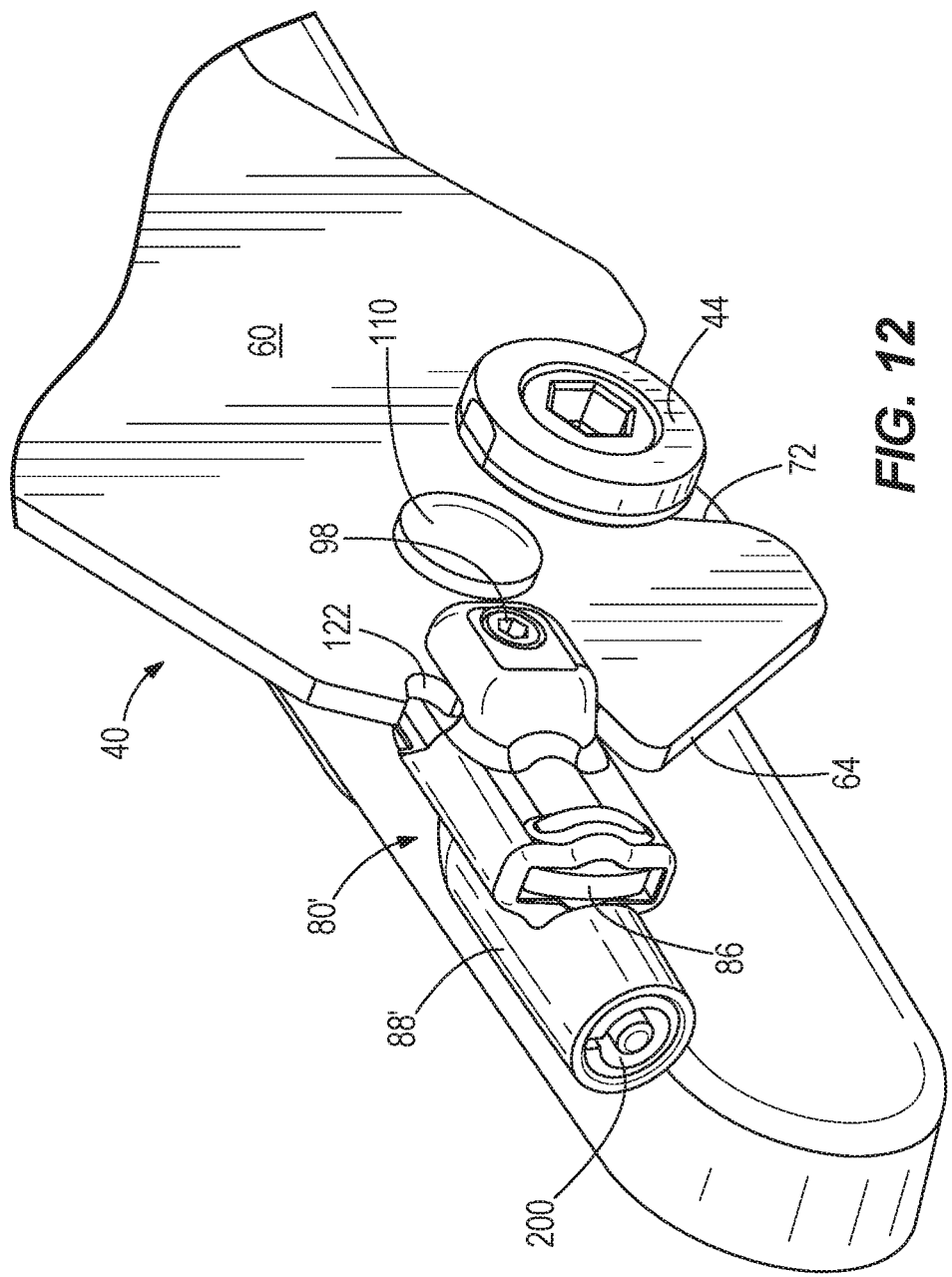

DETACHABLE ACCESSORY AND LATCH FOR SAME

BACKGROUND

The present disclosure relates to saddle-ride vehicles, and more particularly, relates to detachable accessories that can be removably latched onto such vehicles.

SUMMARY

In one aspect, the invention provides a detachable accessory adapted to be received on a set of mounts provided on a saddle-ride vehicle. A pair of side plates are spaced apart along a lateral direction, each one of the pair of side plates including a front edge, a rear edge, and a bottom edge extending between the front and rear edges. The bottom edge of each of the side plates has a slot opening extending to a slot for receiving a respective one of the set of mounts. A latching assembly is supported on a first one of the pair of side plates, the latching assembly including a latch member and a handle. The latch member has a hooked latching portion and an elongated portion projecting rearward from the hooked latching portion. The latch member is supported at a fixed pivot on the first side plate for rotation between an unlatched position and a latched position that at least partially closes the slot opening for the latch member and the first side plate to jointly define a receiving area for retaining a respective one of the mounts. The handle is supported on the elongated portion of the latch member, and the handle is biased in a first direction along the elongated portion so that an end portion of the handle follows the rear edge of the first side plate and forms a detent mechanism therewith. The detent mechanism includes a male detent member, a first receptacle configured to receive the male detent member to hold the latch member in the unlatched position and a second receptacle configured to receive the male detent member to hold the latch member in the latched position, the first receptacle being shallower than the second receptacle. A cam surface extends from the first receptacle to the second receptacle.

In another aspect, the invention provides a detachable accessory adapted to be received on a set of mounts provided on a saddle-ride vehicle. A pair of side plates are spaced apart along a lateral direction, each one of the pair of side plates including a front edge, a rear edge, and a bottom edge extending between the front and rear edges. The bottom edge of each of the side plates has a slot opening extending to a slot for receiving a respective one of the set of mounts. A latching assembly is supported on a first one of the pair of side plates, the latching assembly including a latch member, a handle, and a detent mechanism. The latch member has a hooked latching portion and an elongated portion projecting rearward from the hooked latching portion. The latch member is movable on the first side plate between an unlatched position and a latched position that at least partially closes the slot opening for the latch member and the first side plate to jointly define a receiving area for retaining a respective one of the mounts. An interference portion of the latch member intersects the slot as viewed in the lateral direction when the latch member is in the unlatched position. The handle is supported on the elongated portion of the latch member, and the handle is biased in a first direction along the elongated portion. The detent mechanism is formed between an end portion of the handle and the rear edge of the first side plate. The detent mechanism includes a male detent member, a first receptacle configured to receive the male detent member to hold the latch member in the unlatched position and a second receptacle configured to receive the male detent member to hold the latch member in the latched position. The male detent member laterally spans both the first side plate and the latch member. The latch member is unbiased with respect to the first side plate.

Other aspects of the disclosure will become apparent by consideration of the detailed description and accompanying drawings.

BRIEF DESCRIPTION OF THE DRAWINGS

FIG. 12 is a rear perspective of the latching assembly having an integrated barrel lock.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
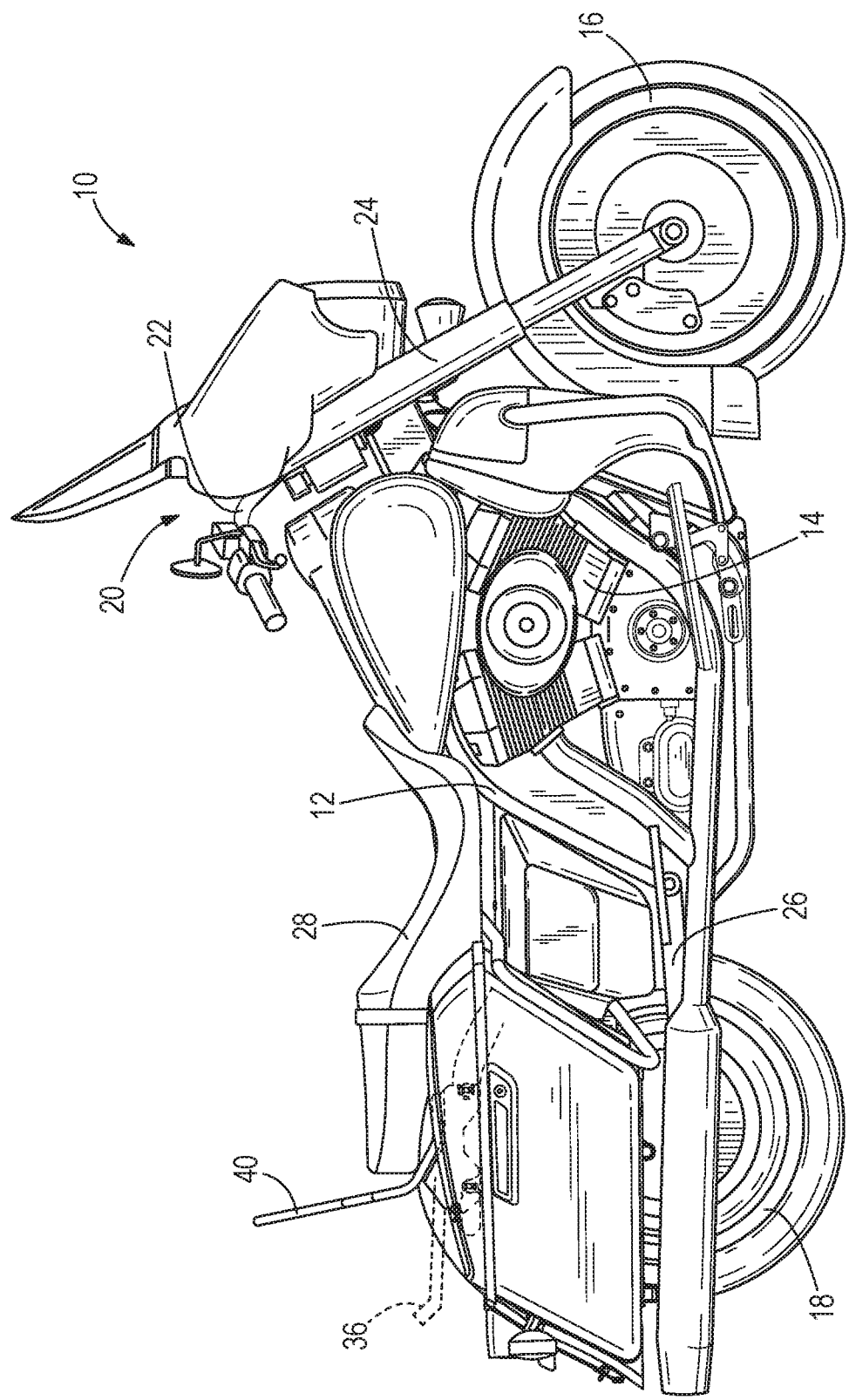
FIG. 1 is a side view of a motorcycle having a set of docking points and a detachable accessory according to one embodiment of the invention supported on the docking points.

FIG. 1 illustrates a motorcycle 10 that includes a frame 12, an engine 14, a single front wheel 16, and at least one rear wheel 18 positioned rearward of the front wheel 16. The front wheel 16 is supported by a steering unit 20 including a handlebar 22 and a front fork 24. The rear wheel 18 is supported pivotably relative to the frame 12 by a swing arm 26. A seat 28 of the motorcycle 10 supports a rider, and optionally a pillion passenger, in a saddle configuration such that the rider's and/or passenger's legs straddle the outside of the motorcycle 10. Although the motorcycle 10 can be provided in a trike configuration in other constructions, the motorcycle 10 is illustrated as a two-wheeled, single track vehicle. As is known in the art, it is often desirable for an owner to be able to quickly mount and dismount accessory components to/from the motorcycle 10. Such accessory components can include various padded backrests (for operator or pillion passenger), luggage racks, sissy bars, luggage containers, etc. As shown in FIG. 1, some motorcycle configurations may support the mounting of multiple accessories (e.g., a luggage rack 36 and a sissy bar 40) to the motorcycle 10, either separately or concurrently depending upon the mounting hardware, referred to as "docking points" or simply "mounts", provided on the motorcycle 10.

In order to support one or more accessories such as the luggage rack 36 and/or the sissy bar 40, the rear portion of the motorcycle 10 is provided with a group of docking points or mounts 44. The mounts 44 can take the form of horizontally-extending protrusions, projecting laterally outward parallel to a lateral direction X as labeled in FIG. 2. The lateral direction X can be perpendicular to a longitudinal direction Y that is parallel to a centerline of the motorcycle 10 and a forward direction of travel. The lateral and longitudinal directions X, Y define a horizontal plane that is perpendicular to a vertical direction Z. Each mount 44 can be cylindrical in shape or have a cylindrical portion having an axis parallel to the lateral direction X, though other shapes may be optional. The mounts 44 can be provided in pairs such that each pair of mounts 44 includes left and right mounts 44 at a common longitudinal position along the motorcycle 10, with the left and right mounts spaced oppositely from a central longitudinal axis of the motorcycle 10. The mounts 44 can be provided along the left and right lateral sides of a rear fender 48 of the motorcycle 10 that partially covers the rear wheel 18 thereof. In some constructions, the motorcycle 10 has left and right fender struts 52 provided to mount the rear fender 48 to the motorcycle frame 12, and the mounts 44 can extend directly from laterally outboard surfaces of the fender struts 52.

Figure 2:
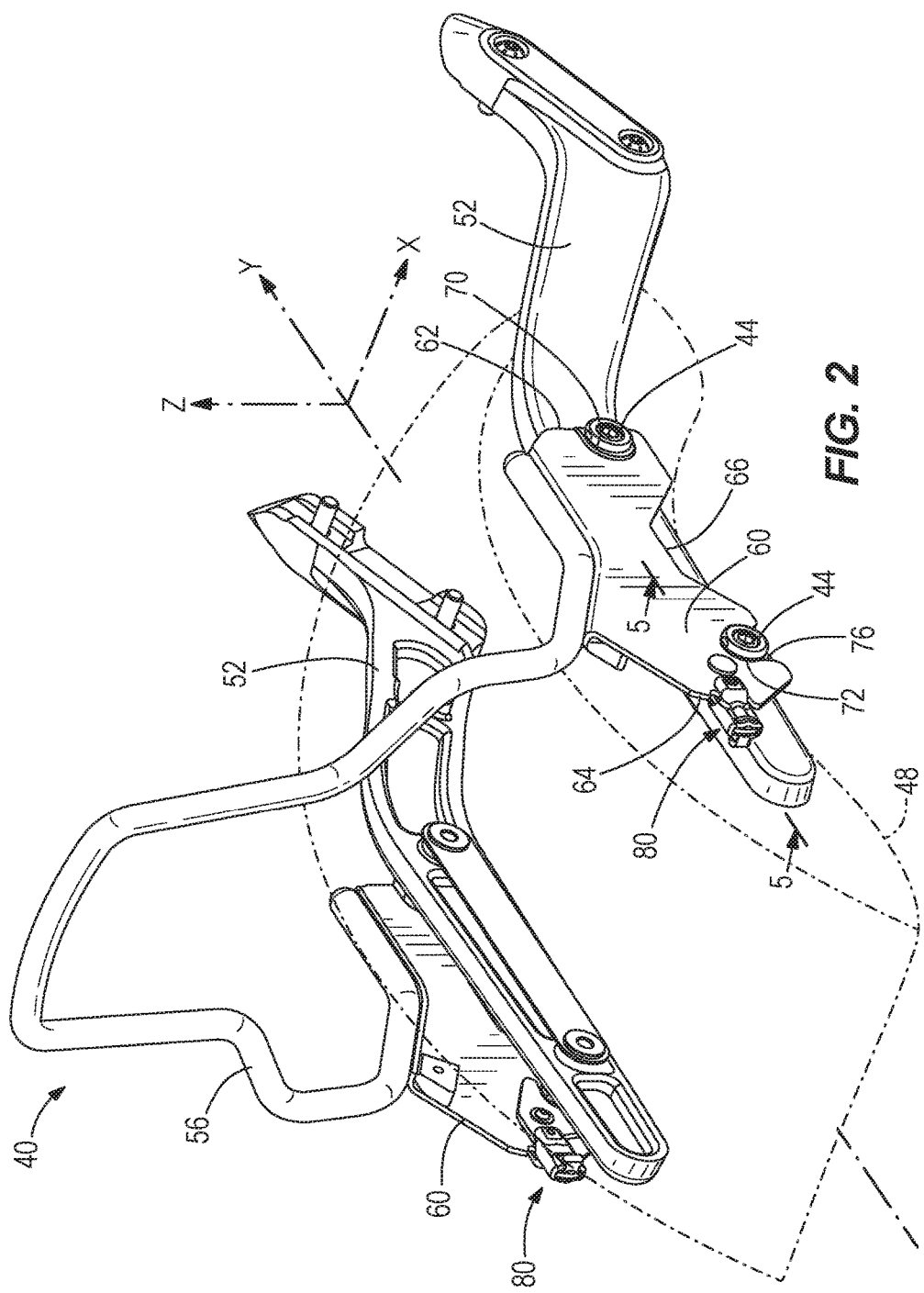
FIG. 2 is a rear perspective view of the detachable accessory of FIG. 1.
Figure 3:
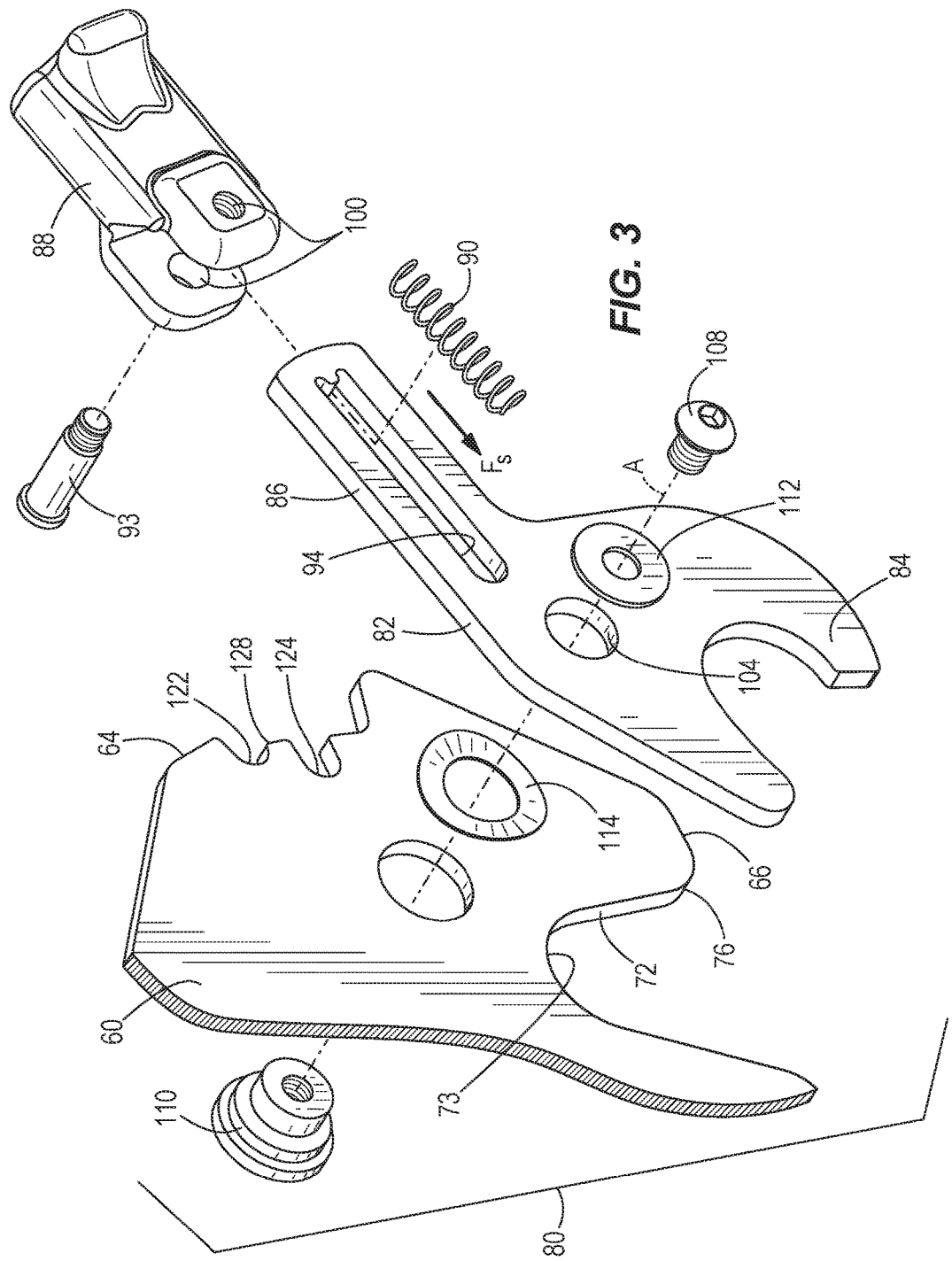
FIG. 3 is an exploded assembly view of a latching assembly of the detachable accessory of FIGS. 1 and 2.
Figure 4:
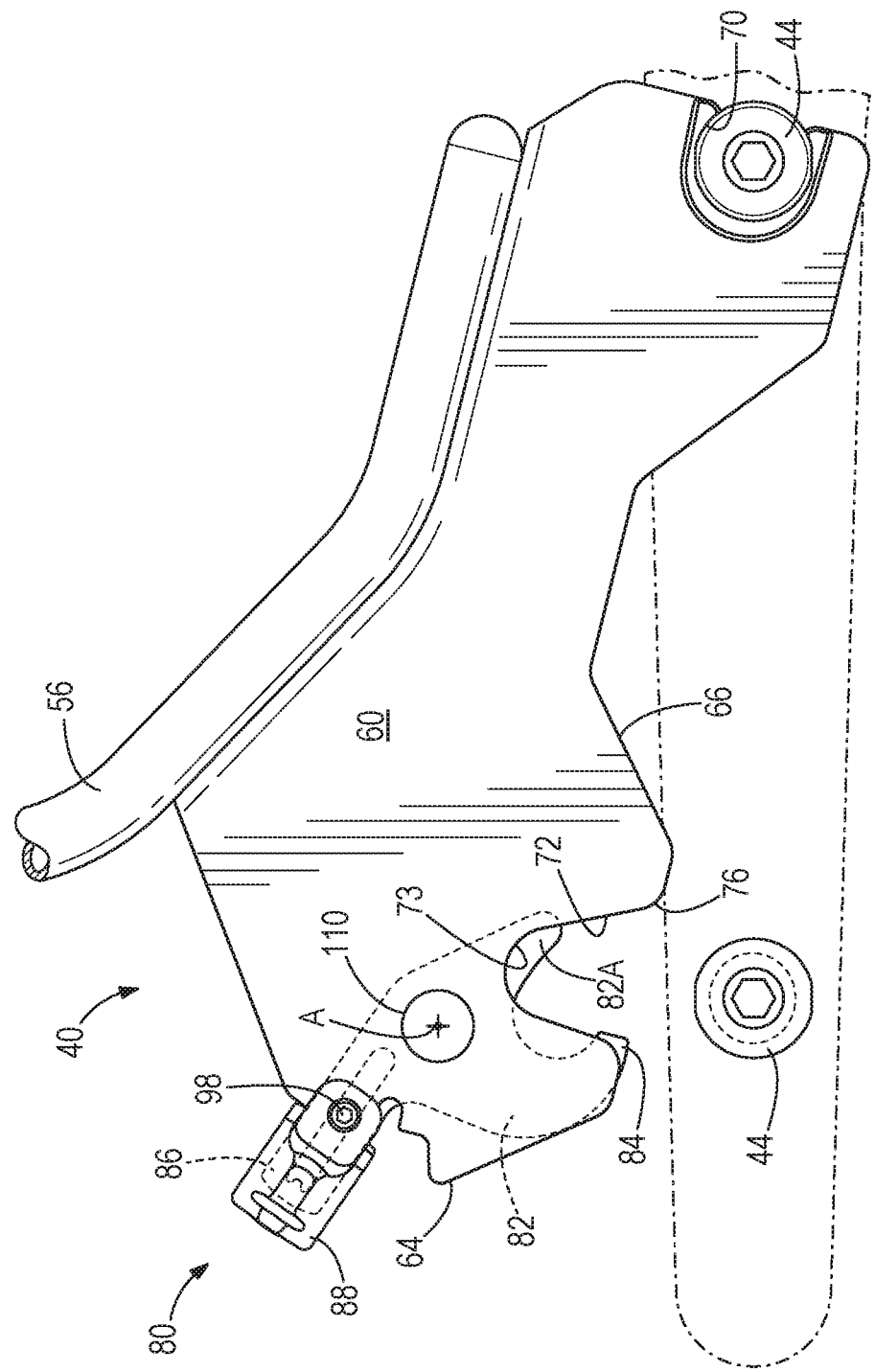
FIG. 4 is a side view of the detachable accessory with the latching assembly in a first configuration in which a latch member of unlatched.

The illustrated accessory of FIG. 2 is a sissy bar 40 that includes a bar portion 56 extending upwardly from a pair of side plates 60 that are spaced from each other in the lateral direction X. Each of the side plates 60 includes a front edge 62, a rear edge 64, and a bottom edge 66 extending between the front and rear edges. In order to engage the mounts 44 for attachment of the sissy bar 40 to the motorcycle 10, each of the side plates 60 includes a pair of slots, including a forward slot 70 provided at the front edge 62 and a rearward slot 72 provided in the bottom edge 66. In particular, the bottom edge 66 of each side plate 60 has a slot opening 76 extending to the rearward slot 72 as shown in FIGS. 2-4. Each rearward slot 72 has an upper closed end 73. The forward slot 70 is positioned ahead of the rearward slot 72 in the forward, longitudinal direction Y. The forward slot 70 can open in the forward direction Y so that the sissy bar 40 slides forwardly onto respective mounts 44 from behind. A latching assembly 80 is provided on at least one of the laterally-spaced side plates 60 to selectively secure a corresponding mount 44 in the corresponding rearward slot 72 to inhibit removal of the sissy bar 40 from the motorcycle. In some constructions, each side plate 60 is provided with a latching assembly 80 of generally the same construction. Prior to further detailed description of the latching assemblies 80, it is noted that the luggage rack 36, and other types of detachable accessories, can have side plates and latching assemblies as described herein. Without providing redundant description, it should be noted that the structures disclosed herein for removably latching an accessory to the mounts 44 of the motorcycle 10 are applicable to a wide variety of accessories, and the sissy bar 40 is merely one exemplary embodiment provided for the purpose of clear illustration. In some constructions, the latching assemblies 80 are identical in construction except for being mirror images of each other. In other constructions, one of the latching assemblies 80 may have additional features, such as a lock, not found on the other latching assembly 80 of the sissy bar 40.

FIG. 3 illustrates one of the latching assemblies 80 in exploded assembly view. Each latching assembly 80 includes a latch member 82 having a hooked latching portion 84 and an elongated portion 86 projecting rearward from the hooked latching portion 84. A handle 88 is supported on the elongated portion 86 of the latch member 82. The handle 88 is biased in a first direction $F_S$ along the elongated portion 86 so that a forward end portion of the handle 88 follows the rear edge 64 of the side plate 60 and forms a detent mechanism therewith, as described further below. The handle 88 can be biased in the first direction $F_S$ by a resilient biasing member (e.g., coil spring) 90. In the illustrated construction, the resilient biasing member 90 is positioned within a slot or aperture 94 provided in the elongated portion 86. The resilient biasing member 90 exerts a biasing force on a pin 98 that is secured to the handle 88 to at least partially define a forward end thereof. The pin 98 may have a length and a transverse cross-sectional shape that is rounded (e.g., cylindrical or at least a cylindrical portion). The pin 98 may extend through a pair of apertures 100 in the forward end of the handle 88, which end is bifurcated such that the pin 98 extends between two separate segments thereof. The pin 98 is fixed with respect to the handle 88 by way of the engagement with the apertures 100. For example, the pin 98 can have a threaded end that screws into female threads provided in one of the apertures 100. In other constructions, the pin 98 can be secured by other means, e.g., press-fit, clip, welding, bonding, etc. Against the force of the resilient biasing member 90, the handle 88 can be pulled by a human user to move the handle 88 from an engaged position in which the pin 98 is engaged with the rear edge 64 of the side plate 60 to a released position in which the pin 98 is disengaged from the rear edge 64 of the side plate 60. The bifurcated forward end of the handle 88 is wide enough so that it receives or engulfs not only the elongated portion 86 of the latch member 82, but also the rear edge 64 of the corresponding side plate 60. Thus, the pin 98 laterally spans both the latch member 82 and the first side plate 60.

Figure 8:
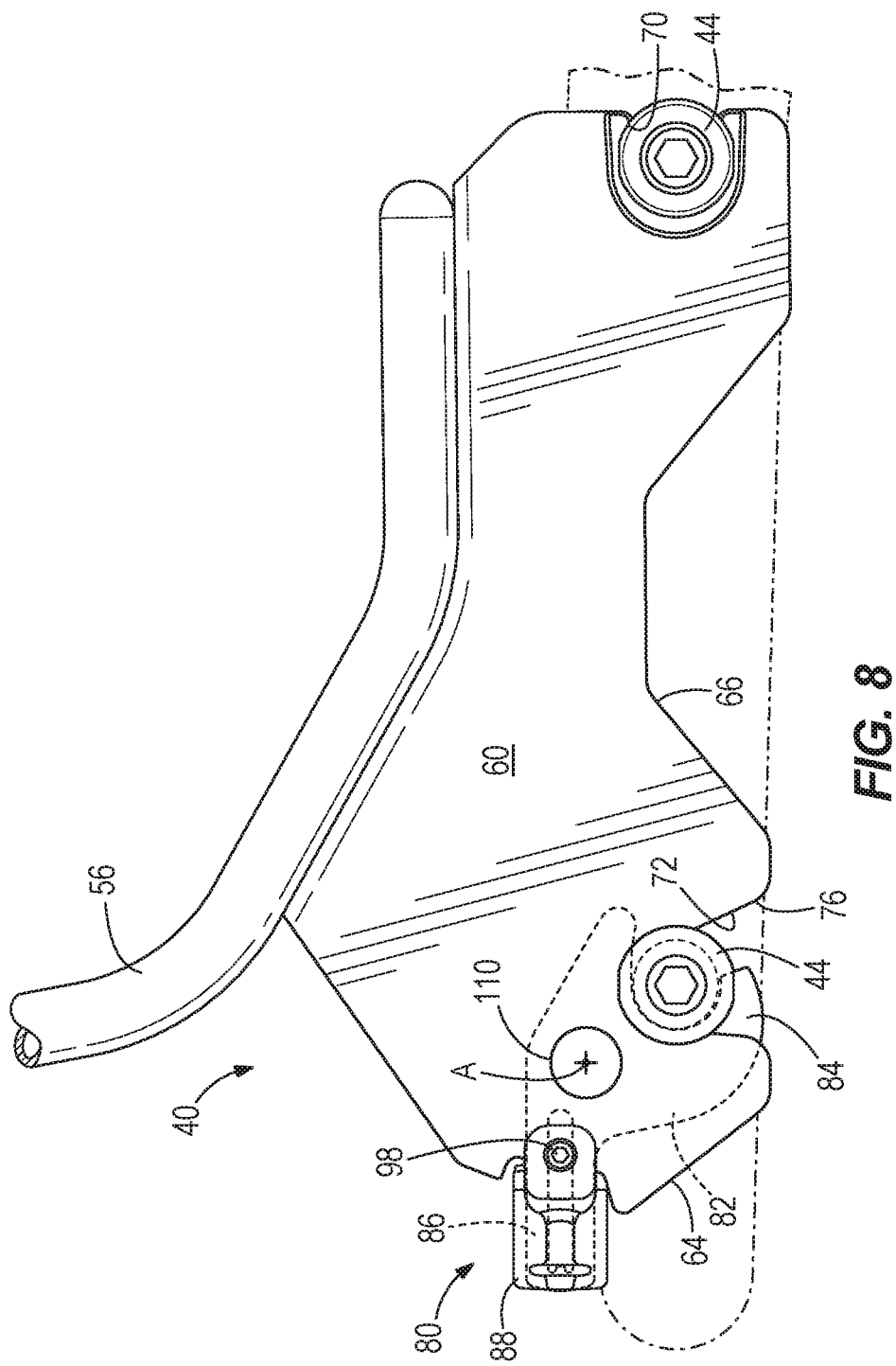
FIG. 8 is a side view of the detachable accessory with the latching assembly in a third configuration in which the latch member is in the latched position.
Figure 9:
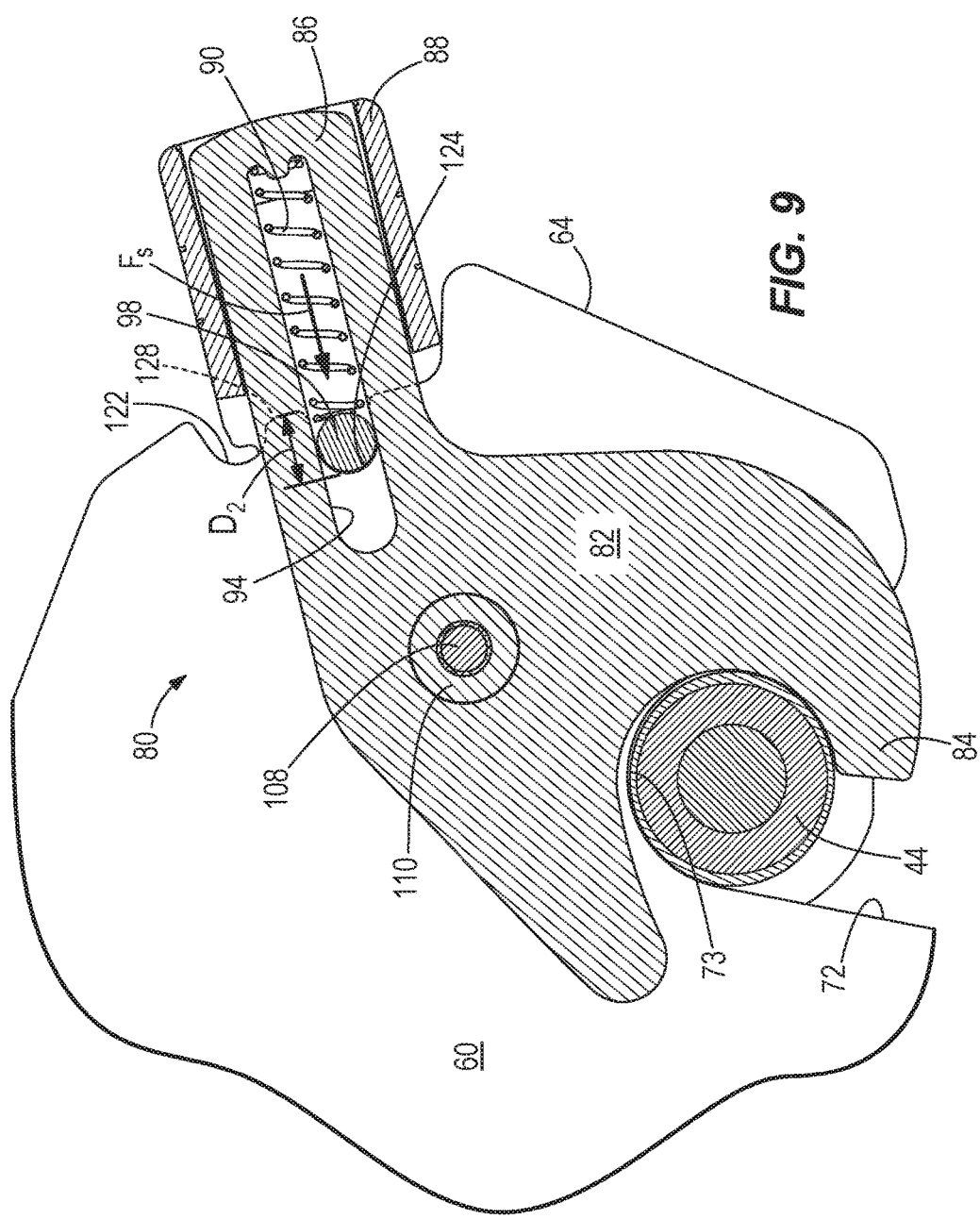
FIG. 9 is a cross-section of the detachable accessory taken along line 5-5 of FIG. 2 to show the latching assembly in the third configuration of FIG. 8.

The latching assembly 80 is pivotally coupled to the side plate 60 to allow rotation about a fixed pivot defining a fixed axis A. The structure of the fixed pivot is provided by an aperture 104 provided in the latch member 82, a corresponding aperture provided in the side plate 60, and a fastener assembly. As shown in FIG. 3, the fastener assembly includes a screw 108, a nut 110, a first washer 112, and a second washer 114. The second washer 114 can be a spring washer that is preloaded when the screw 108 and the nut 110 are fully tightened to secure the fixed pivot. Being "fixed", the axis A is not movable along the side plate 60 or along the latch member 82. As supported on the side plate 60 by the fastener assembly, the latch member 82, and also the latching assembly 80 as a whole, is pivotally supported for rotation between an unlatched position (FIGS. 4 and 5) and a latched position (FIGS. 8 and 9). Although the handle 88 is biased, the latch member 82 is unbiased about the axis A with respect to the side plate 60. In the unlatched position, the latch member 82 allows passage of a corresponding mount 44 into and out of the rearward slot 72 through the slot opening 76 in the bottom edge 66. This allows the rear end of the sissy bar 40 to be moved freely either down onto the mount 44, during assembly of the sissy bar 40 onto the motorcycle 10, or up off of the mount 44, during removal of the sissy bar 40 from the motorcycle 10. In the latched position, the latch member 82 at least partially closes the slot opening 76 so that the latch member 82 and the side plate 60 jointly define a receiving area for retaining the corresponding mount 44. The captive retaining of the mount 44 in the receiving area prevents movement of the sissy bar 40 relative to the mounts 44 and relative to the motorcycle 10 as a whole when the latch member 82 is in the latched position.

In order to distinctly define the latched and unlatched positions, a detent mechanism is provided between the side plate 60 and the latching assembly 80. The detent mechanism includes a male detent member (e.g., the pin 98) along with first and second receptacles 122, 124 as shown in the exploded assembly view of FIG. 3. The first and second receptacles 122, 124 are formed as adjacent vertically-stacked recesses in the rear edge 64 of the side plate 60 in the illustrated construction. As shown in FIG. 9, each of the receptacles 122, 124 can be formed with a rounded, semi-circular cross-section shape for receiving at least a portion of the pin 98. The respective first and second receptacles 122, 124 are configured to receive the pin 98 to hold the latch member 82 in the corresponding one of the unlatched and latched positions. The first receptacle 122 defining the unlatched position can be shallower than the second receptacle 124 defining the latched position. Along the first direction $F_S$ of the bias force exerted on the pin 98, the second receptacle 124 has a greater depth $D_2$ (FIG. 9) than the first receptacle 122, particularly compared to the depth $D_1$ (FIG. 5) of the first receptacle 122 measured on a side closest to the second receptacle 124. The depth $D_1$ of the first receptacle 122 on the side closest to the second receptacle 124 can be less than a radius of the pin 98 and/or a radius of the first receptacle 122, which may be one in the same. This feature reduces the force required to move the latch member 82 from the unlatched position to the latched position, and may enable the latch member 82 to be so moved without requiring the user to manually move the handle 88 from the engaged position to the released position. A cam surface 128 is formed by the rear edge 64 of the side plate 60, extending between the first and second receptacle 122, 124. When the latch member 82 is moved from the unlatched position to the latched position without the user manually moving the handle 88 from the engaged position to the released position, the pin 98 follows the cam surface 128 as it traverses from the first receptacle 122 to the second receptacle 124, and the handle 88 is driven from the engaged position toward the released position as the pin 98 rides up and out of the first receptacle 122 to the cam surface 128, against the resilient biasing member 90. In addition, the cam surface 128 can be sloped down toward the second receptacle 124 rather than being perpendicular to the first direction $F_S$ so that the force from the resilient biasing member 90 also helps urge the pin 98 toward the second receptacle 124. The latching assembly 80 can thus provide an automatic latching feature when the user forces the sissy bar 40 down onto the mounts 44 as described further below. The depth $D_2$ of the second receptacle 124 is greater than a radius of the pin 98, and the second receptacle 124 includes a straight wall extending to the cam surface 128, to prevent a reverse movement of the pin 98 from the second receptacle 124 to the first receptacle 122 without operation of the handle 88 to the released position.

Figure 5:
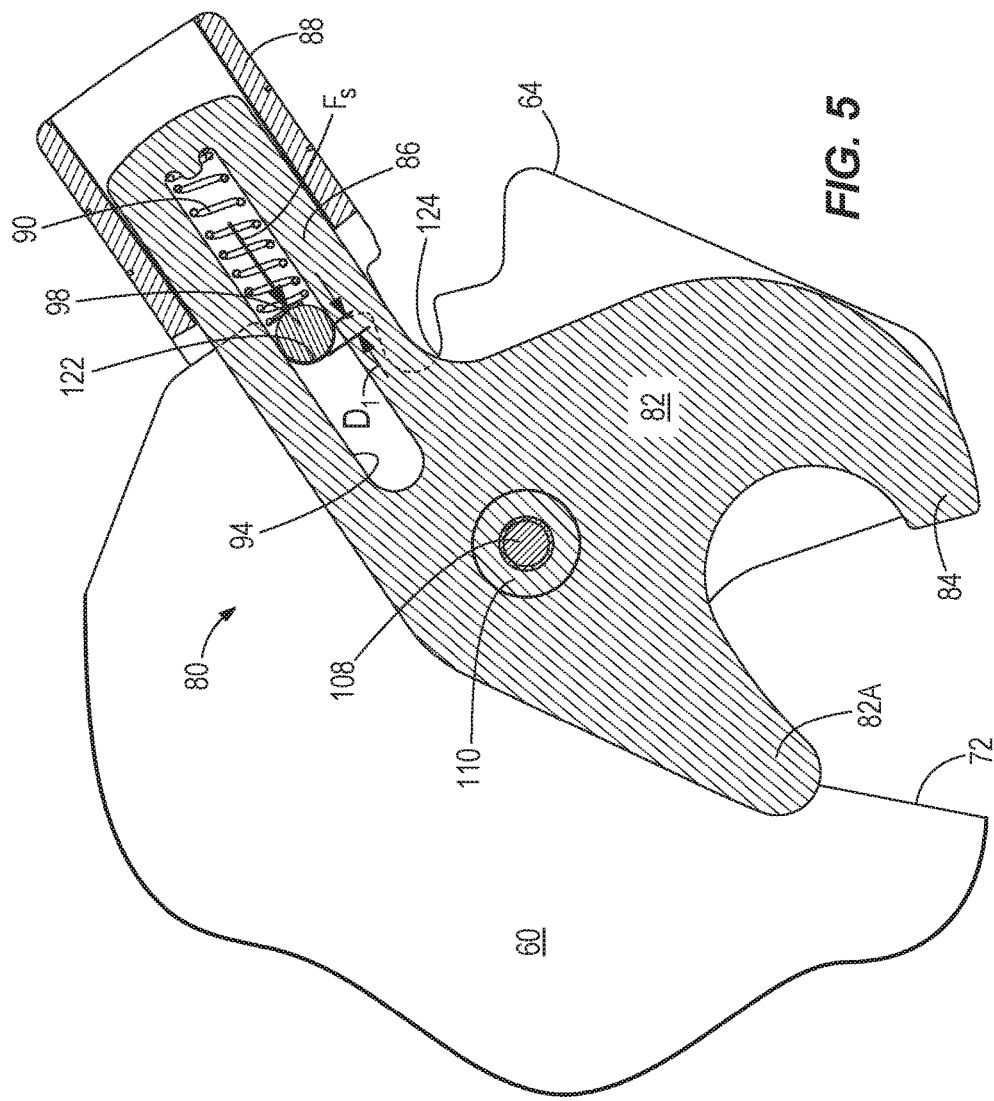
FIG. 5 is a cross-section of the detachable accessory taken along line 5-5 of FIG. 2 to show the latching assembly in the first configuration of FIG. 4.
Figure 6:
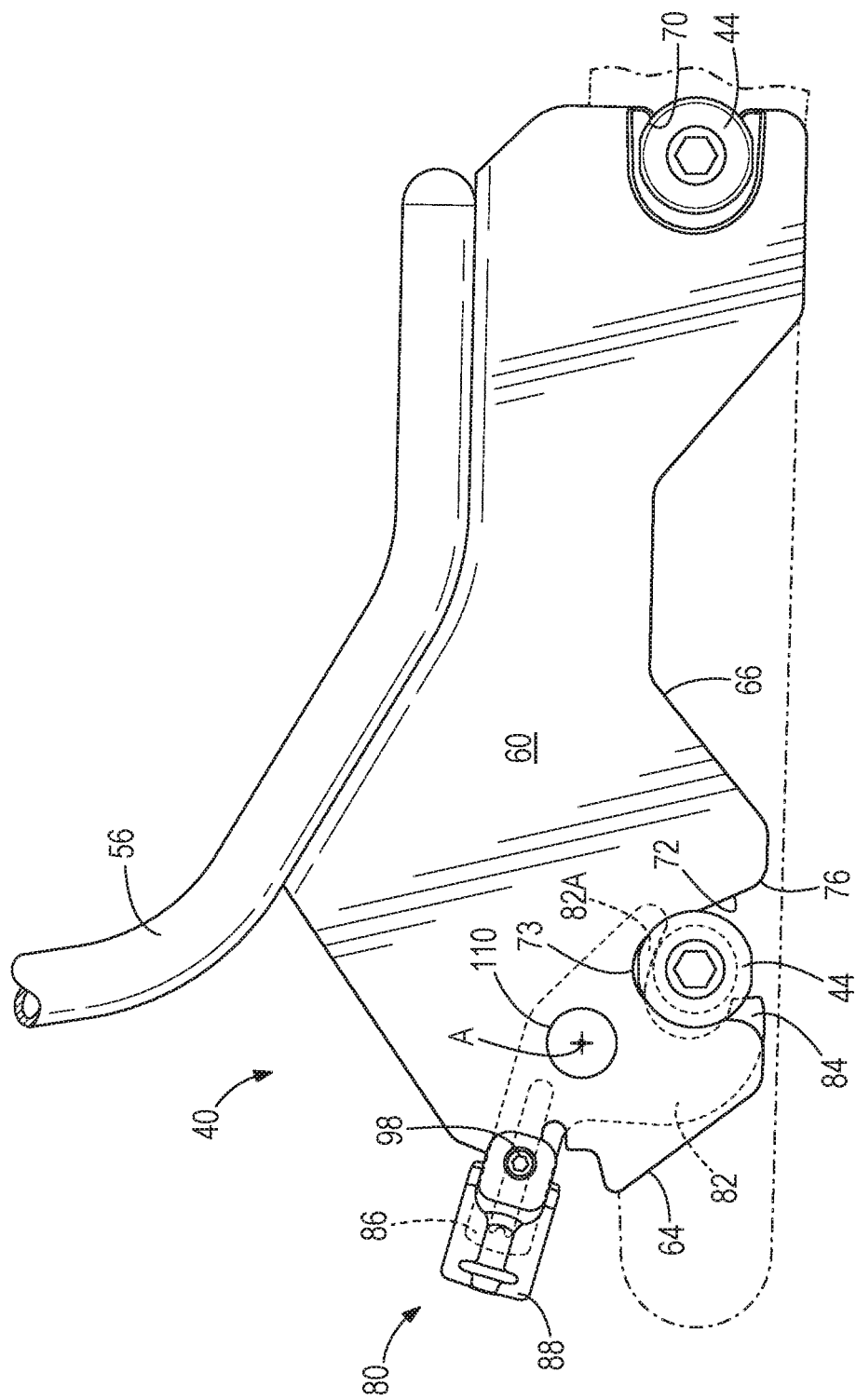
FIG. 6 is a side view of the detachable accessory with the latching assembly in a second configuration in which the latch member is urged toward a latched position.
Figure 7:
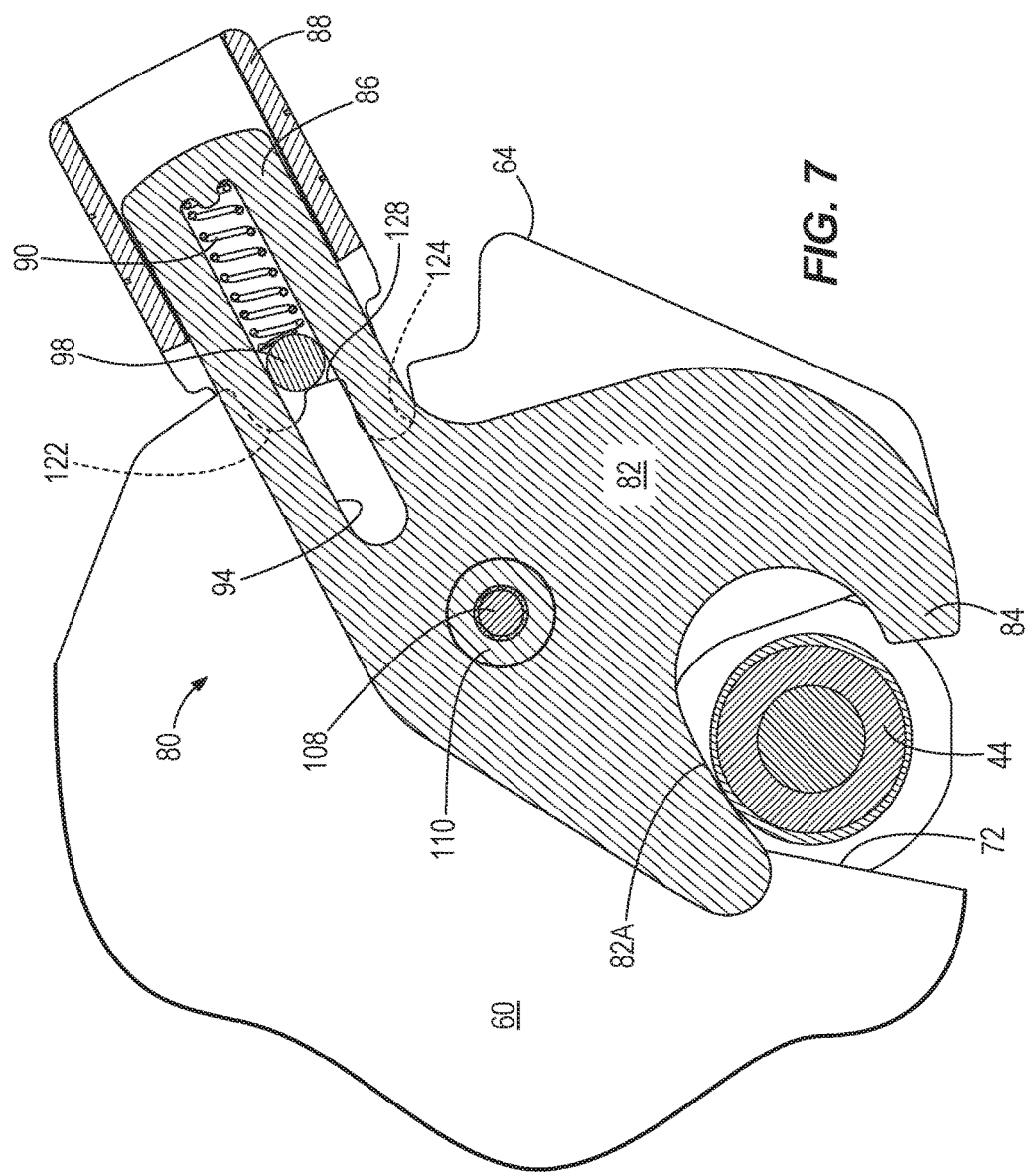
FIG. 7 is a cross-section of the detachable accessory taken along line 5-5 of FIG. 2 to show the latching assembly in the second configuration of FIG. 6.

With reference to FIGS. 4 and 5, the latching assembly 80 is in the unlatched position. It is noted that the forward slot 70 is already engaged with the forward mount 44. It is also again noted that the sissy bar 40 can have another laterally-spaced side plate 60 and latching assembly 80 for engaging another set of similar mounts 44 laterally-spaced from those shown. In the unlatched position, the latch member 82 does not obstruct the mount 44 from entering the slot opening 76. However, a portion 82A of the latch member 82 intersects the rearward slot 72 adjacent the upper closed end 73 as viewed in the lateral direction when the latch member 82 is in the unlatched position. Thus, this portion 82A of the latch member 82 presents itself for contact with the corresponding mount 44 prior to the mount 44 reaching the upper closed end 73 of the slot 72. The amount of overlap or intersection of the latch member 82 with the rearward slot 72 is of an amount that is sufficient to drive the latch member 82 out of the unlatched position (releasing the pin 98 out of the first receptacle 122) when the sissy bar 40 is pressed down to drive the mount 44 to the upper closed end 73 as shown in FIGS. 6 and 7. In fact, contact between the mount 44 and the intersecting portion 82A of the latch member 82 can be sufficient to automatically drive the latch member 82 all the way to the latched position of FIGS. 8 and 9 in which the pin 98 is seated in the second receptacle 124. This provides a significant convenience to the user, who is not required to manipulate the handle 88 in order to latch the latching assembly 80 and secure the sissy bar 40 to the motorcycle 10.

Figure 10:
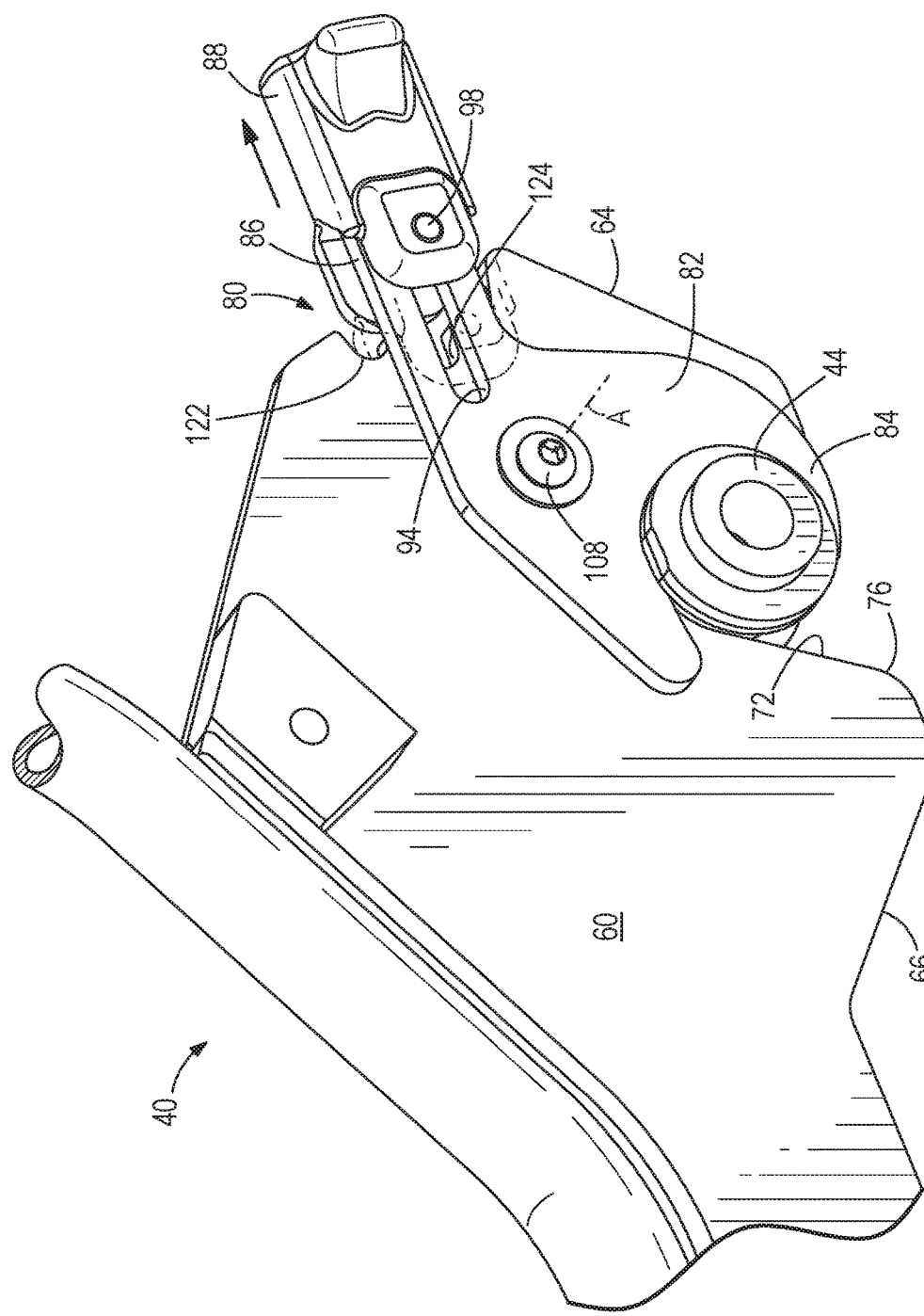
FIG. 10 is a perspective view of a latch handle being pulled back to release a detent mechanism that holds the latch member in the latched position.
Figure 11:
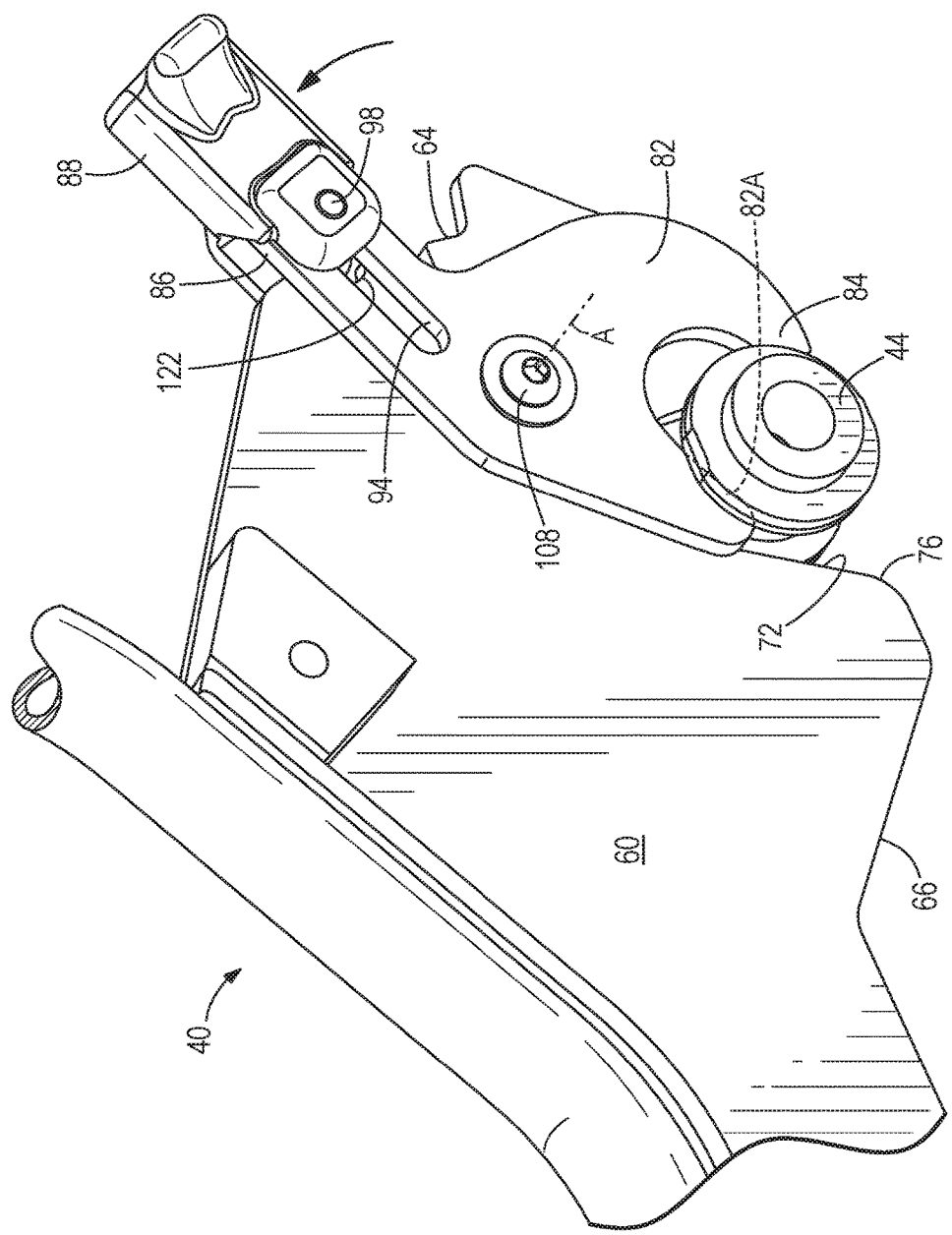
FIG. 11 is a perspective view of the latch member rotated to the unlatched position to drive the detachable accessory upward with respect to the docking points.

In the event that the user later wishes to remove the sissy bar 40 from the motorcycle 10, the handle 88 is pulled from the engaged position back to the released position as shown in FIG. 10. Simultaneously, the user may operate the handle 88 of the laterally-spaced latching assembly 80 (FIG. 2) of the other side plate 60 in the same way. Once in the released position, the handle 88 is manually operated to rotate the latching assembly 80, and the latch member 82 thereof, about the fixed pivot axis A to the unlatched position as shown in FIG. 11. In doing so, the portion 82A of the latch member is brought into interference with the rearward slot 72 adjacent the upper closed end 73 as viewed in the lateral direction. As such, the action of rotating the latch member 82 from the latched position to the unlatched position automatically lifts the sissy bar 40 up with respect to the mount 44, as the mount 44 is pushed out of contact with the upper closed end 73. This assists the user in the removal effort by at least partially disengaging the rearward slot 72 from the corresponding mount 44. This may be especially helpful with precision components that fit tightly together.

As shown in FIG. 12, the sissy bar 40 or other detachable accessory can be provided with an additional security feature via a lockable latching assembly 80'. The lockable latching assembly 80' can be provided on one of the side plates 60, while the other side plate 60 of the detachable accessory has the latching assembly 80 of FIGS. 2-11 having no designated locking feature since the detachable accessory is not removable from the mounts 44 of the motorcycle 10 without both rear mounts 44 being simultaneously disengaged by the respective latching members 82. The lockable latching assembly 80' can have the features and functions of the latching assembly 80 as shown in FIGS. 2-11 and described above, except as noted specifically below. The lockable latching assembly 80' includes a handle 88' that is selectively slidable on the latching member 82 between an engaged position and a released position. However, the handle 88' includes a lock 200 that is operable to lock the handle 88' in the engaged position with respect to the latch member 82 and the rear edge 64 of the side plate 60. The lock 200 can be locked when the latching assembly 80' is in the latched position to prevent the handle 88' from being moved to release the pin 98 from the second receptacle 124. Only when unlocked does the lock 200 release the handle 88' for movement along the latch member 82 to release the pin 98 from the second receptacle 124 to allow unlatching. In the illustrated construction, the lock 200 is a keyed lock having a key slot and being operable between locked and unlocked states with a designated, matching key (e.g., a barrel key, not shown, configured to fit into a cylindrical key slot).

What is claimed is:

1. A detachable accessory adapted to be received on a set of mounts provided on a saddle-ride vehicle, the detachable accessory comprising:
    a pair of side plates spaced apart along a lateral direction, each one of the pair of side plates including a front edge, a rear edge, and a bottom edge extending between the front and rear edges, the bottom edge of each of the side plates having a slot opening extending to a slot for receiving a respective one of the set of mounts;
    a latching assembly supported on a first one of the pair of side plates, the latching assembly including
        a latch member having a hooked latching portion and an elongated portion projecting rearward from the hooked latching portion, the latch member being supported at a fixed pivot on the first side plate for rotation between an unlatched position and a latched position that at least partially closes the slot opening for the latch member and the first side plate to jointly define a receiving area for retaining a respective one of the mounts, and
        a handle supported on the elongated portion of the latch member, the handle being biased in a first direction along the elongated portion so that an end portion of the handle follows the rear edge of the first side plate and forms a detent mechanism therewith,
        wherein the detent mechanism includes a male detent member, a first receptacle configured to receive the male detent member to hold the latch member in the unlatched position and a second receptacle configured to receive the male detent member to hold the latch member in the latched position, the first receptacle being shallower than the second receptacle; and
    a cam surface extending from the first receptacle to the second receptacle.

2. The detachable accessory of claim 1, wherein an interference portion of the latch member intersects the slot adjacent an upper closed end thereof as viewed in the lateral direction when the latch member is in the unlatched position.

3. The detachable accessory of claim 2, wherein the male detent member is drivable out of the first receptacle, along the cam surface, and into the second receptacle upon movement of the interference portion out of intersection with the slot, without any direct actuation of the handle.

4. The detachable accessory of claim 1, wherein the first receptacle and the second receptacle are formed in the rear edge of the first side plate and the male detent member is formed by the end portion of the handle.

5. The detachable accessory of claim 1, wherein the elongated portion of the latch member includes an elongated slot, and the male detent member is formed by a pin of the handle that extends through the elongated slot, and the pin is biased in the first direction by a spring positioned within the elongated slot.

6. The detachable accessory of claim 1, further comprising a lock formed in the handle and operable to selectively lock the latch member in the latched position by preventing a releasing movement of the handle along the elongated portion.

7. The detachable accessory of claim 1, wherein the latch member is not biased with respect to the first side plate about the fixed pivot.

8. The detachable accessory of claim 1, wherein the male detent member laterally spans both the first side plate and the latch member.

9. The detachable accessory of claim 1, wherein the end portion of the handle engulfs the rear edge of the first side plate from both lateral sides.

10. The detachable accessory of claim 1, wherein a single aperture is formed in the elongated portion of the latch member, and no portion of the aperture is exposed on a rearward side of the handle when the latch member is in the latched position and the male detent member is seated in the first receptacle.

11. A detachable accessory adapted to be received on a set of mounts provided on a saddle-ride vehicle, the detachable accessory comprising:
    a pair of side plates spaced apart along a lateral direction, each one of the pair of side plates including a front edge, a rear edge, and a bottom edge extending between the front and rear edges, the bottom edge of each of the side plates having a slot opening extending to a slot for receiving a respective one of the set of mounts; and
    a latching assembly supported on a first one of the pair of side plates, the latching assembly including
        a latch member having a hooked latching portion and an elongated portion projecting rearward from the hooked latching portion, the latch member being movable on the first side plate between an unlatched position and a latched position that at least partially closes the slot opening for the latch member and the first side plate to jointly define a receiving area for retaining a respective one of the mounts, wherein an interference portion of the latch member intersects the slot as viewed in the lateral direction when the latch member is in the unlatched position,
        a handle supported on the elongated portion of the latch member, the handle being biased in a first direction along the elongated portion, and
        a detent mechanism formed between an end portion of the handle and the rear edge of the first side plate, wherein the detent mechanism includes a male detent member, a first receptacle configured to receive the male detent member to hold the latch member in the unlatched position and a second receptacle configured to receive the male detent member to hold the latch member in the latched position,
    wherein the male detent member laterally spans both the first side plate and the latch member, and
    wherein the latch member is unbiased with respect to the first side plate.

12. The detachable accessory of claim 11, wherein the latch member is supported at a fixed pivot on the first side plate for rotation between the unlatched position and the latched position.

13. The detachable accessory of claim 11, wherein a single aperture is formed in the elongated portion of the latch member, and no portion of the aperture is exposed on a rearward side of the handle when the latch member is in the latched position and the male detent member is seated in the first receptacle.

14. The detachable accessory of claim 11, wherein the male detent member is drivable out of the first receptacle, without any direct actuation of the handle, upon movement of the interference portion out of interference with the slot.

15. The detachable accessory of claim 14, wherein the first receptacle is shallower than the second receptacle on at least a side of the first receptacle nearest the second receptacle.

16. The detachable accessory of claim 15, wherein a cam surface extends from the first receptacle to the second receptacle, and wherein the male detent member is driven along the cam surface into the second receptacle by movement of the interference portion out of interference with the slot.

17. The detachable accessory of claim 11, wherein the end portion of the handle engulfs the rear edge of the first side plate from both lateral sides.

18. The detachable accessory of claim 11, wherein the elongated portion of the latch member includes an elongated slot, and the male detent member is formed by a pin of the handle that extends through the elongated slot, and the pin is biased in the first direction by a spring positioned within the elongated slot.

19. The detachable accessory of claim 11, wherein the first receptacle and the second receptacle are formed in the rear edge of the first side plate and the male detent member is formed by the end portion of the handle.

20. The detachable accessory of claim 11, further comprising a lock formed in the handle and operable to selectively lock the latch member in the latched position by preventing a releasing movement of the handle along the elongated portion.

* * * * *